United States Patent
Kato

(10) Patent No.: US 9,909,785 B2
(45) Date of Patent: Mar. 6, 2018

(54) HEAT PUMP DEVICE WITH SIMULTANEOUS USE OF AIR AND GEOTHERMAL HEAT SOURCES

(71) Applicant: Yohei Kato, Tokyo (JP)

(72) Inventor: Yohei Kato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 472 days.

(21) Appl. No.: 14/428,199

(22) PCT Filed: Oct. 5, 2012

(86) PCT No.: PCT/JP2012/076005
§ 371 (c)(1),
(2) Date: Mar. 13, 2015

(87) PCT Pub. No.: WO2014/054176
PCT Pub. Date: Apr. 10, 2014

(65) Prior Publication Data
US 2015/0267941 A1   Sep. 24, 2015

(51) Int. Cl.
*F25B 6/02* (2006.01)
*F25B 30/06* (2006.01)
(Continued)

(52) U.S. Cl.
CPC .............. *F25B 6/02* (2013.01); *F25B 13/00* (2013.01); *F25B 27/00* (2013.01); *F25B 27/005* (2013.01);
(Continued)

(58) Field of Classification Search
CPC . F25B 30/06; F24F 5/0046; F24F 2005/0057; F24J 3/081; Y02E 10/10; Y02E 10/18; Y02B 10/40
See application file for complete search history.

(56) References Cited

U.S. PATENT DOCUMENTS

| | | | | |
|---|---|---|---|---|
| 5,461,876 A | * | 10/1995 | Dressler | F24J 3/083 237/2 B |
| 2008/0016895 A1 | * | 1/2008 | Kim | F24F 5/0046 62/260 |
| 2011/0042057 A1 | | 2/2011 | Li et al. | |

FOREIGN PATENT DOCUMENTS

CN   101586854 A   11/2009
JP   57-16732 U   1/1982
(Continued)

OTHER PUBLICATIONS

Office Action dated Sep. 9, 2016 issued in corresponding CN patent application No. 201280076240.9 (and English translation).
(Continued)

*Primary Examiner* — Jonathan Bradford
(74) *Attorney, Agent, or Firm* — Posz Law Group, PLC

(57) ABSTRACT

A heat pump device that collects heat both air and geothermal heat sources, and a controller determines, by comparing the temperature of an additional heat source and the current refrigerant temperature, whether or not to switch to simultaneous operation when there is insufficient capacity during single operation. During heating operation, the operation is switched to simultaneous operation if the temperature of the additional heat source is greater than the current refrigerant temperature, and single operation is continued if the temperature of the additional heat source is no greater than the current refrigerant temperature. As another determination method for during heating operation, the refrigerant temperature after addition of geothermal heat source is estimated and the heat pump is switched to simultaneous operation if the estimated refrigerant temperature is greater than the current refrigerant temperature. Single operation is continued if the estimated refrigerant temperature is no greater than the current refrigerant temperature.

12 Claims, 7 Drawing Sheets

(51) Int. Cl.
   *F25B 27/00* (2006.01)
   *F25B 49/02* (2006.01)
   *F25B 13/00* (2006.01)
   *F24F 5/00* (2006.01)

(52) U.S. Cl.
   CPC .............. *F25B 30/06* (2013.01); *F25B 49/02* (2013.01); *F24F 5/0046* (2013.01); *F24F 2005/0057* (2013.01); *F25B 2313/002* (2013.01); *F25B 2313/003* (2013.01); *F25B 2313/009* (2013.01); *F25B 2700/21161* (2013.01)

(56) References Cited

FOREIGN PATENT DOCUMENTS

| | | |
|---|---|---|
| JP | 2006-125769 A | 5/2006 |
| JP | 2006-258407 A | 9/2006 |
| JP | 2006-349332 A | 12/2006 |
| JP | 2008-164237 A | 7/2008 |
| JP | 2009-243802 A | 10/2009 |
| JP | 2010-216783 A | 9/2010 |
| WO | 2010/131378 A1 | 11/2010 |

OTHER PUBLICATIONS

Office Action dated Jan. 29, 2016 issued in corresponding CN patent application No. 201280076240.9 (and English translation).
Office Action dated Nov. 24, 2015 issued in corresponding JP patent application No. 2014-539562 (and English translation).
International Search Report of the International Searching Authority dated Nov. 13, 2012 for the corresponding international application No. PCT/JP2012/076005 (and English translation).
Extended European Search Report dated Jun. 23, 2016 issued in corresponding EP patent application No. 12885989.9.
Office Action dated Jul. 5, 2016 issued in corresponding JP patent application No. 2014-539562 (and English translation).

\* cited by examiner

HEAT PUMP DEVICE WITH SIMULTANEOUS USE OF AIR AND GEOTHERMAL HEAT SOURCES

CROSS REFERENCE TO RELATED APPLICATION

This application is a U.S. national stage application of PCT/JP2012/076005 filed on Oct. 5, 2012, the contents of which are incorporated herein by reference.

TECHNICAL FIELD

The present invention relates to a heat pump device using a plurality of heat sources.

BACKGROUND

In general, heat pump devices to be used for a cooling and heating apparatus and a hot water supply device use air as a heat source.

Further, in regions where an outdoor air temperature is low, a heat pump device using underground heat in heating has also come to be used.

In an air heat-source heat pump device using heat of air as a heat source, when an outdoor air temperature is low in a heating operation, a heating capacity may be reduced due to reduction in suction pressure, frosting, or the like. Thus, operation efficiency of the heat pump device depends on the outdoor air temperature.

In an underground-heat heat pump device using underground heat, when an underground temperature is higher than an outdoor air temperature, the amount of collected heat can be increased, and hence the operation efficiency is higher than that of the air heat-source heat pump device. However, when the underground temperature is lower than the outdoor air temperature, conversely, the operation efficiency of the underground-heat heat pump device is worse than that of the air heat-source heat pump device.

Further, although the underground temperature varies less throughout the year as compared to the outdoor air temperature, the variation width of the underground temperature depends on the district, depth, and season. Also for this reason, the operation efficiency of the underground-heat heat pump device may be worse than that of the air heat-source heat pump device.

As a measure for solving those problems, in Patent Literature 1, there is disclosed a technology of switching between an air heat-source heat exchanger, which is installed on the ground to use outdoor air as a heat source, and an underground heat-source heat exchanger, which uses underground heat collected by an underground heat exchanger buried in the ground as a heat source. In Patent Literature 1, a passage is switched so that the air heat source exchanger may be used when an outdoor air temperature is equal to or higher than a predetermined value or when a refrigerant temperature is equal to or higher than a predetermined value (for example, equal to or higher than a temperature at which the air heat source exchanger is frosted) and that the underground heat-source heat exchanger may be used when the refrigerant temperature is equal to or lower than the predetermined value.

PATENT LITERATURE

Patent Literature 1: Japanese Unexamined Patent Application Publication No. 2010-216783 (FIGS. 1 and 4)

Patent Literature 1 employs a configuration in which heat is collected from one of the underground heat exchanger and the air heat exchanger on a case-by-case basis. However, if heat can be collected simultaneously from the outdoor air and the underground so that the operation may be switched between an operation of collecting one of the underground heat exchanger and the air heat exchanger on a case-by-case basis (hereinafter referred to as "single operation") and an operation of collecting heat simultaneously from the outdoor air and the underground (hereinafter referred to as "simultaneous operation"), when the capacity is insufficient in the single operation, for example, the operation can be switched to the simultaneous operation to compensate for the insufficiency of the capacity.

However, the capacity is not necessarily increased when the operation is switched to the simultaneous operation. Depending on the outdoor air temperature and the heat source temperature, the amount of heat collected by the heat pump as a whole is conversely reduced when the operation is switched to the simultaneous operation, with the result that the necessary capacity may still not be obtained.

It is therefore important to accurately determine the switching from the single operation to the simultaneous operation. However, in Patent Literature 1, the simultaneous operation is not performed in the first place, and no review is made on how to determine the switching between the single operation and the simultaneous operation.

Incidentally, in recent years, the underground heat as well as the outdoor air has come to be used as a heat source in the heat pump device as described above, but the use of another heat source than the underground heat has been demanded.

SUMMARY

The present invention has been made in view of the above-mentioned circumstances, and it is an object thereof to provide a heat pump device configured to collect heat both from outdoor air and another heat source and capable of accurately determining switching from a single operation to a simultaneous operation so as to effectively use a heat source.

According to one embodiment of the present invention, there is provided a heat pump device, including: a refrigerant circuit including a first circuit and a second circuit, the first circuit including: a compressor; a refrigerant passage of a use-side heat exchanger; a first pressure reducing device; and a first heat-source heat exchanger configured to use outdoor air serving as a first heat source as a heat source, the second circuit including: a second pressure reducing device; and a refrigerant passage of a second heat-source heat exchanger, the refrigerant passage being connected in series to the second pressure reducing device, the second circuit being connected in parallel to the first pressure reducing device and the first heat-source heat exchanger of the first circuit, the compressor having a discharge side connected to a condenser, wherein the use side heat exchanger serves as the condenser or at least either one of the first heat-source heat exchanger and the second heat-source heat exchanger serves as the condenser; a heat exchange medium circuit including a heat exchange medium passage of the second heat-source heat exchanger, and configured to circulate therethrough a heat exchange medium serving as a second heat source, the second heat source being used to exchange heat with another heat source than the outdoor air so as to receive heat of the another heat source; a use-side heat exchanger outlet temperature detector configured to detect an outlet temperature of a use-side medium flowing out from a use-side medium passage of the use-side heat exchanger; and a controller having a single operation selecting the first heat-source heat exchanger or the second heat-source heat exchanger to cause a refrigerant to flow therethrough and a simultaneous operation causing a refrigerant to flow through both of the first heat-source heat exchanger and the second heat-source heat exchanger, the controller being configured to: determine, when a capacity is insufficient in the single operation currently in operation and when the outlet temperature of the use-side medium detected by the use-side heat exchanger outlet temperature detector fails to be set to a target temperature, whether or not the capacity is improved through addition of a heat source; and switch the single operation to the simultaneous operation when it is determined that the capacity is to be improved.

According to one embodiment of the present invention, the heat pump device, which is capable of accurately determining switching from the single operation to the simultaneous operation so as to effectively use the heat source, may be provided.

DETAILED DESCRIPTION

Now, an embodiment of the present invention is described on the assumption that a system to which a heat pump device is applied is an air conditioning system configured to perform heating or cooling.

Figure 1:
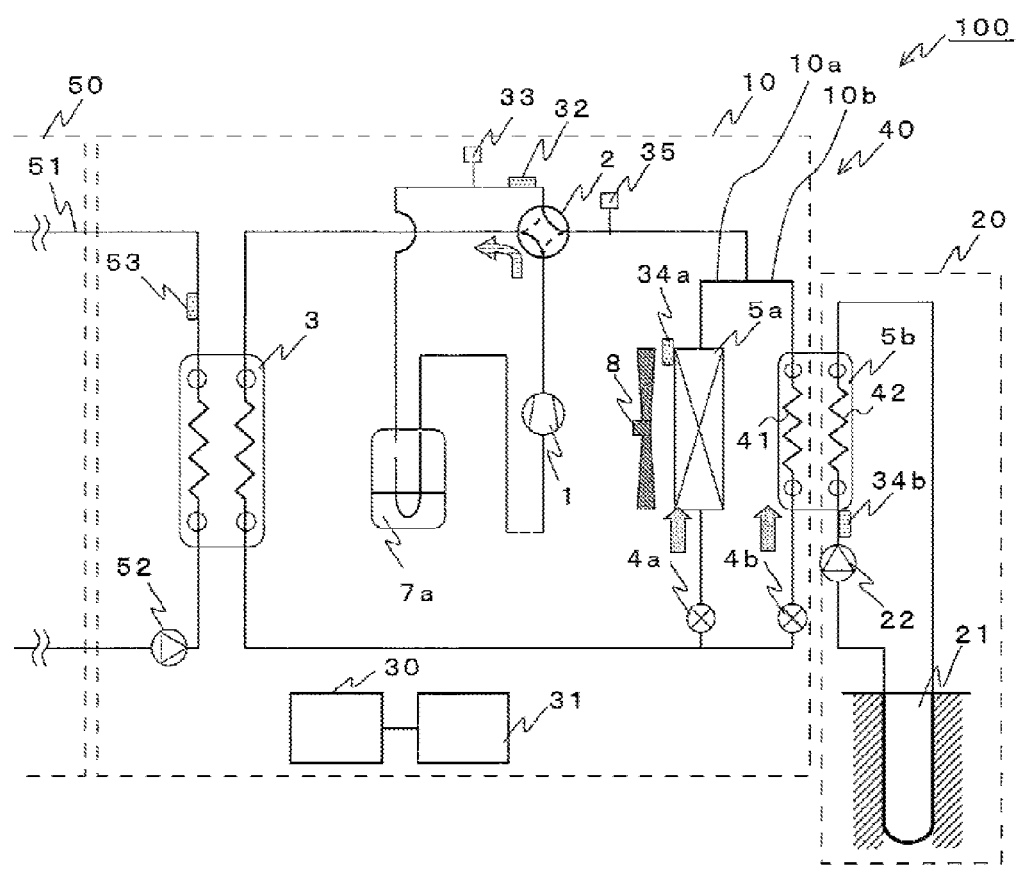
FIG. 1 is a diagram illustrating a refrigerant circuit of an air conditioning system to which a heat pump device is applied according to one embodiment of the present invention.

FIG. 1 is a diagram illustrating a refrigerant circuit of the air conditioning system to which the heat pump device is applied according to one embodiment of the present invention. The arrows in FIG. 1 represent the flow of a refrigerant in a heating operation.

An air conditioning system 100 includes a heat pump device 40 and a use-side device 50. The use-side device 50 includes a use-side circuit 51 through which a use-side medium circulates, and performs heating or cooling by using the heat pump device 40 as a heat source.

<<Heat Pump Device>>

The heat pump device 40 includes a refrigerant circuit 10 through which a refrigerant circulates, an underground heat source-side circuit 20, a controller 30, and a storage device 31, and is installed outdoors.

<Refrigerant Circuit>

The refrigerant circuit 10 includes a first circuit 10a in which a compressor 1, a four-way valve 2 serving as a main refrigerant flow switching valve configured to switch a passage of the refrigerant, a water heat exchanger 3 serving as a use-side heat exchanger, an expansion valve 4a serving as a first pressure reducing device, and an air heat-source heat exchanger 5a serving as a first heat-source heat exchanger are connected in this order by refrigerant pipes, and a second circuit 10b connected in parallel to a part of the first circuit 10a. The second circuit 10b is formed by connecting an expansion valve 4b serving as a second pressure reducing device and a refrigerant passage 41 of an underground heat-source heat exchanger 5b serving as a second heat-source heat exchanger in series, and is connected in parallel to the expansion valve 4a and the air heat-source heat exchanger 5a of the first circuit 10a.

(Compressor)

The compressor 1 is, for example, a fully hermetic compressor, and has a configuration in which an electric motor unit (not shown) and a compression unit (not shown) are housed in a compressor shell (not shown). A low-pressure refrigerant sucked into the compressor 1 is compressed, and discharged from the compressor 1 as a high-temperature and high-pressure refrigerant. A rotation speed of the compressor 1 is controlled by the controller 30 via an inverter (not shown), and the compressor 1 thereby controls a capacity of the heat pump device 40. In this case, the magnitude difference in pressure is not determined by the relationship with a reference pressure (numerical value), but is expressed based on a relative magnitude difference (including an intermediate level) in the refrigerant circuit 10 through pressurization by the compressor 1, control of an opening and closing state (opening degree) of each of the expansion valves 4a and 4b, and the like. The same holds true for the magnitude difference in temperature.

(Water Heat Exchanger)

The water heat exchanger 3 exchanges heat between a use-side medium (in this case, water) in the use-side circuit 51 of the use-side device 50 and a refrigerant in the refrigerant circuit 10. In the use-side circuit 51, water is circulated by a pump 52. In the case of heating, the water heat exchanger 3 functions as a condenser, and generates warm water by heating the water with heat of the refrigerant in the refrigerant circuit 10. In the case of cooling, the water heat exchanger 3 functions as an evaporator, and generates cold water by cooling the water with cooling energy of the refrigerant in the refrigerant circuit 10. The warm water or the cold water is used to heat or cool the indoor space. Examples of the form of the heat exchanger include a plate type in which plates are stacked on one another and a double pipe type formed of a heat transfer pipe through which a refrigerant flows and a heat transfer pipe through which water flows. Any type of the heat exchanger may be employed in this embodiment. Note that, the use-side medium that circulates through the use-side circuit 51 is not limited to water, and may be an antifreeze liquid, such as brine.

(Expansion Valve)

The expansion valve 4a adjusts the flow rate of a refrigerant flowing through the air heat-source heat exchanger 5a. Further, the expansion valve 4b adjusts the flow rate of a refrigerant flowing through the refrigerant passage 41 of the underground heat-source heat exchanger 5b. The opening degree of each of the expansion valves 4a and 4b is set so as to be variable based on a control signal from the controller 30. Each of the expansion valves 4a and 4b may be an electronic expansion valve whose opening degree is variable based on an electric signal, or may be of another type in which a plurality of orifices or capillaries are connected in parallel so that the flow rate of a refrigerant flowing into the heat exchanger may be controlled based on an opening and closing operation of a solenoid value or the like.

(Air Heat-Source Heat Exchanger)

The air heat-source heat exchanger 5a is, for example, a fin-and-tube heat exchanger formed of copper or aluminum. The air heat-source heat exchanger 5a is a heat exchanger using air (outdoor air) as a heat source, and exchanges heat between the outdoor air supplied from a fan 8 and the refrigerant.

(Four-Way Valve)

The four-way valve 2 is used to switch the flow in the refrigerant circuit 10. Through the switching of the passage, the water heat exchanger 3 can be used as a condenser in a heating operation and used as an evaporator in a cooling operation.

<<Underground Heat Source-Side Circuit>>

The underground heat source-side circuit 20, which serves as a heat exchange medium circuit, is formed by connecting an underground heat source-side medium passage (heat exchange medium passage) 42 of the underground heat-source heat exchanger 5b, an underground heat exchanger 21 buried in the ground, and a geothermal heat pump 22 in this order by pipes. In the underground heat source-side circuit 20, an underground heat source-side medium serving as a heat exchange medium, which is an antifreeze liquid, such as brine, circulates so as to collect underground heat.

(Underground Heat Exchanger)

The underground heat exchanger 21, which serves as a heat-source heat exchanger for the underground heat-source heat exchanger 5b, is constructed by, for example, a group of resin-made heat collection pipes that are formed into a substantially U-shape and buried in the ground vertically or horizontally. Heat exchange performance of the underground heat exchanger 21 varies depending on the buried district and depth even when the group of heat collection pipes having the same dimensions is buried.

(Underground Heat-Source Heat Exchanger)

The underground heat-source heat exchanger 5b exchanges heat between the refrigerant circulating through the refrigerant circuit 10 and the underground heat source-side medium circulating through the underground heat source-side circuit 20. The underground heat source-side medium, which has collected the underground heat by the underground heat exchanger 21, flows into the underground heat source-side medium passage 42 of the underground heat-source heat exchanger 5b, and hence the heat collected from the underground by the underground heat exchanger 21 is transferred to the refrigerant on the refrigerant passage 41 side. In this manner, the refrigerant circuit 10 collects the underground heat. Similarly to the water heat exchanger 3, the underground heat-source heat exchanger 5b is constructed by a plate-type or double pipe-type heat exchanger, and any type of the heat exchanger may be employed.

<Controller>

Based on detection values from respective sensors, the controller 30 controls the rotation speed of each actuator (compressor 1, fan 8, geothermal heat pump 22, and pump 52) and the opening degrees of the expansion valves 4a and 4b so that an outlet water temperature of the use-side circuit 51 may be a target water temperature that is set in accordance with a set temperature of the air conditioning system 100. Further, the controller 30 controls the overall air conditioning system, including the control of the switching of the four-way valve 2 and the processing of flowcharts of FIGS. 8 and 9 to be described later.

<Storage Device>

The storage device 31 stores various kinds of information used for calculating the current heat exchange performance of each of the air heat-source heat exchanger 5a and the underground heat-source heat exchanger 5b. The various kinds of information are described later.

<Description of Sensors>

The heat pump device 40 is equipped with temperature or pressure sensors as necessary. Detection values of the respective sensors are input to the controller 30, and used for operation control of the heat pump device 40, capacity control of the compressor 1, for example, and opening degree control of the expansion valves 4a and 4b. In FIG. 1, the heat pump device 40 includes an outdoor air temperature sensor 34a serving as a first heat source temperature detector, a geothermal heat temperature sensor 34b serving as a second heat source temperature detector, a refrigerant temperature sensor 32 serving as a refrigerant temperature detector, and an outlet water temperature detection sensor 53 serving as a use-side heat exchanger outlet temperature detector.

The outdoor air temperature sensor 34a detects a temperature of the outdoor air serving as a heat source. The geothermal heat temperature sensor 34b detects a temperature of the underground heat source-side medium that has exchanged heat with the underground by the underground heat exchanger 21 and been pumped by the geothermal heat pump 22. The refrigerant temperature sensor 32 detects a saturation temperature of the suction pressure in the refrigerant circuit 10. Note that, the refrigerant temperature sensor 32 may be a suction pressure sensor 33 configured to detect a pressure of the refrigerant on the suction side of the compressor 1 as illustrated in FIG. 1, and in this case, the refrigerant saturation temperature only needs to be converted from the refrigerant pressure by the controller 30. The outlet water temperature detection sensor 53 detects an outlet water temperature of the use-side circuit 51 (an outlet water temperature of the use-side medium passage of the water heat exchanger 3).

Now, the heating operation and the cooling operation of the air conditioning system 100 are described. Note that, the heat pump device 40 is capable of performing a simultaneous operation using both an air heat source and an underground heat source and a single operation using the air heat source or the underground heat source. Each of the simultaneous operation and the single operation is described.

(Heating Operation)

Next, how the air conditioning system 100 operates in the heating operation according to this embodiment is described in order of the simultaneous operation and the single operation. In the heating operation, the four-way valve 2 is switched to the solid line side of FIG. 1.

(Heating Operation: Simultaneous Operation)

Figure 2:
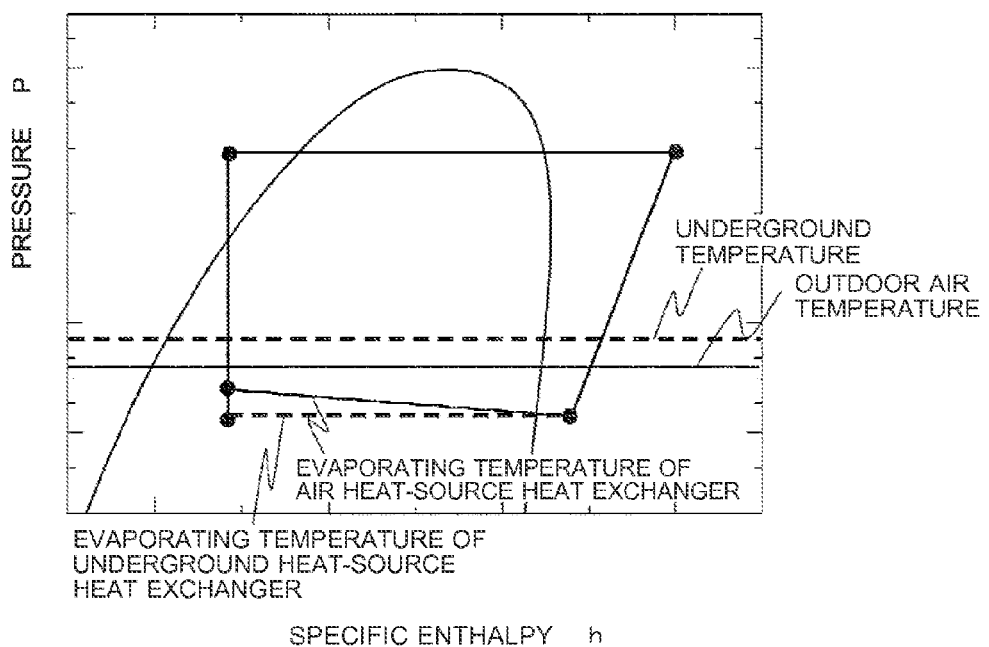
FIG. 2 is a graph showing a relationship between an operating state of the air conditioning system of FIG. 1 in a heating operation and an outdoor air temperature and an underground temperature that are heat source temperatures.

FIG. 2 is a chart showing the relationship between the operating state of the air conditioning system 100 of FIG. 1 in the heating operation and an outdoor air temperature and an underground temperature that are heat source temperatures. In this case, the underground temperature is higher than the outdoor air temperature.

A low-temperature and low-pressure refrigerant is compressed by the compressor 1, and discharged therefrom as a high-temperature and high-pressure refrigerant. The high-temperature and high-pressure refrigerant discharged from the compressor 1 passes through the four-way valve 2, which is switched for heating, and flows into the water heat exchanger 3 so as to transfer heat to water in the use-side circuit 51. The resultant low-temperature and high-pressure refrigerant obtained through the heat transfer to the water branches into two passages, and the respective refrigerants flow into the expansion valves 4a and 4b to be depressurized.

The refrigerant depressurized by the expansion valve 4a flows into the air heat-source heat exchanger 5a, is evaporated through heat reception from the outdoor air, and flows out from the air heat-source heat exchanger 5a. On the other hand, the refrigerant depressurized by the expansion valve 4b flows into the underground heat-source heat exchanger 5b, and receives heat through heat exchange with the underground heat source-side medium. Underground heat is collected through this heat exchange. Then, the refrigerant evaporated through the collection of the underground heat joins the refrigerant flowing out from the air heat-source heat exchanger 5a, and passes through the four-way valve 2 and a refrigerant container 7a again to be sucked into the compressor 1.

(Heating Operation: Single Operation (with Air Heat Source Selected))

In the case of selecting the air heat source, the opening degree of the expansion valve 4a is controlled, the expansion valve 4b is closed, the geothermal heat pump 22 is stopped, and the fan 8 is operated. The refrigerant discharged from the compressor 1 passes through the four-way valve 2, which is switched for heating, and flows into the water heat exchanger 3 so as to transfer heat to the water serving as the use-side medium. The resultant high-pressure and low-temperature refrigerant is depressurized by the expansion valve 4a, and thereafter flows into the air heat-source heat exchanger 5a so as to receive heat from the outdoor air, with the result that the refrigerant is evaporated. Then, the refrigerant flowing out from the air heat-source heat exchanger 5a flows into the four-way valve 2 again, and thereafter passes through the refrigerant container 7a to be sucked into the compressor 1.

(Heating Operation: Single Operation (with Underground Heat Source Selected))

In the case of selecting the underground heat source, the expansion valve 4a is closed, the opening degree of the expansion valve 4b is controlled, the geothermal heat pump 22 is driven, and the fan 8 is stopped. The refrigerant discharged from the compressor 1 passes through the four-way valve 2, which is switched for heating, and flows into the water heat exchanger 3 so as to transfer heat to the water serving as the use-side medium. The resultant high-pressure and low-temperature refrigerant is depressurized by the expansion valve 4b, and thereafter flows into the underground heat-source heat exchanger 5b.

On the other hand, in the underground heat source-side circuit 20, the underground heat source-side medium exchanges heat with the underground by the underground heat exchanger 21 to collect underground heat, and the underground heat source-side medium that has collected the underground heat flows into the underground heat-source heat exchanger 5b. Then, the refrigerant in the refrigerant circuit 10 collects the underground heat through heat exchange with the underground heat source-side medium by the underground heat-source heat exchanger 5b, and is evaporated. Then, the refrigerant flowing out from the underground heat-source heat exchanger 5b flows into the four-way valve 2 again, and thereafter passes through the refrigerant container 7a to be sucked into the compressor 1.

(Cooling Operation)

Next, how the air conditioning system 100 operates in the cooling operation is described in order of the simultaneous operation and the single operation. In the cooling operation, the four-way valve 2 is switched to the dotted line side of FIG. 1.

(Cooling Operation: Simultaneous Operation)

Figure 3:
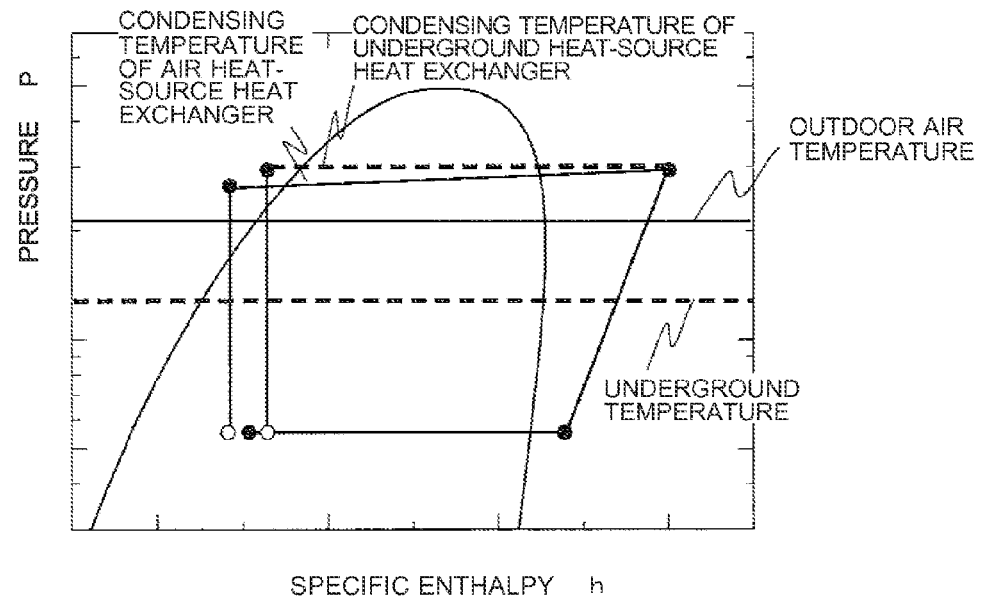
FIG. 3 is a graph showing a relationship between an operating state of the air conditioning system of FIG. 1 in a cooling operation and the outdoor air temperature and the underground temperature that are the heat source temperatures.

FIG. 3 is a chart showing the relationship between the operating state of the air conditioning system of FIG. 1 in the cooling operation and heat source temperatures (outdoor air temperature and underground temperature). In this case, the underground temperature is lower than the outdoor air temperature.

A low-temperature and low-pressure refrigerant is compressed by the compressor 1, and discharged therefrom as a high-temperature and high-pressure refrigerant. The high-temperature and high-pressure refrigerant discharged from the compressor 1 passes through the four-way valve 2, which is switched for cooling, and thereafter branches into two passages. One refrigerant flows into the air heat-source heat exchanger 5a, and the other refrigerant flows into the underground heat-source heat exchanger 5b.

The refrigerant flowing into the air heat-source heat exchanger 5a transfers heat to the atmospheric air to be a low-temperature and high-pressure refrigerant. The low-temperature and high-pressure refrigerant flows out from the air heat-source heat exchanger 5a, and flows into the expansion valve 4a to be depressurized. On the other hand, the refrigerant flowing into the underground heat-source heat exchanger 5b transfers heat to the underground heat source-side medium to be a low-temperature and high-pressure refrigerant. The low-temperature and high-pressure refrigerant flows out from the underground heat-source heat exchanger 5b, and flows into the expansion valve 4b to be depressurized. Then, the refrigerant depressurized by the expansion valve 4b joins the refrigerant depressurized by the expansion valve 4a, and flows into the water heat exchanger 3. The refrigerant flowing into the water heat exchanger 3 is evaporated through heat reception from the water in the use-side circuit 51, and passes through the four-way valve 2 and the refrigerant container 7a to be sucked into the compressor 1 again.

(Cooling Operation: Single Operation (with Air Heat Source Selected))

In the case of selecting the air heat source, the opening degree of the expansion valve 4a is controlled, the expansion valve 4b is closed, the geothermal heat pump 22 is stopped, and the fan 8 is operated. The refrigerant discharged from the compressor 1 passes through the four-way valve 2, which is switched for cooling, and thereafter flows into the air heat-source heat exchanger 5a so as to transfer heat to the outdoor air, followed by flowing out from the air heat-source heat exchanger 5a. The refrigerant flowing out from the air heat-source heat exchanger 5a flows into the expansion valve 4a to be depressurized, and thereafter flows into the water heat exchanger 3. The refrigerant flowing into the water heat exchanger 3 is evaporated through heat reception from the water in the use-side circuit 51, and passes through the four-way valve 2 and the refrigerant container 7a to be sucked into the compressor 1 again.

(Cooling Operation: Single Operation (with Underground Heat Source Selected))

In the case of selecting the underground heat source, the expansion valve 4a is closed, the opening degree of the expansion valve 4b is controlled, the geothermal heat pump 22 is driven, and the fan 8 is stopped. The refrigerant discharged from the compressor 1 passes through the four-way valve 2, which is switched for cooling, and thereafter flows into the underground heat-source heat exchanger 5b.

On the other hand, in the underground heat source-side circuit 20, the underground heat source-side medium exchanges heat with the underground by the underground heat exchanger 21 to collect cooling energy from the underground, and the underground heat source-side medium that has collected the cooling energy flows into the underground heat-source heat exchanger 5b of the second circuit 10b. Then, the refrigerant in the refrigerant circuit 10 collects the cooling energy through heat exchange with the underground heat source-side medium by the underground heat-source heat exchanger 5b, and is condensed. The condensed refrigerant flows into the expansion valve 4b to be depressurized, and thereafter flows into the water heat exchanger 3. The refrigerant flowing into the water heat exchanger 3 is evaporated through heat reception from the water in the use-side circuit 51, and passes through the four-way valve 2 and the refrigerant container 7a to be sucked into the compressor 1 again.

(Summary of Characteristic Control in this Embodiment)

According to this embodiment, in the case where the capacity is insufficient in the single operation in which the outdoor air or the underground heat is selected as a heat source even if the actuator currently in operation is operated so that, for example, the rotation speed of the compressor 1 is increased to the upper limit, that is, in the case where the outlet water temperature of the use-side circuit 51 cannot be set to a target water temperature, the controller 30 determines the necessity of the addition of a heat source. Then, when it is determined that a heat source needs to be added, the controller 30 adds the other heat source. In other words, the controller 30 switches the single operation to the simultaneous operation.

A method of determining the necessity of the addition of a heat source is described later. In the determination, it is necessary to calculate a heat exchange amount in each of the air heat-source heat exchanger 5a and the underground heat-source heat exchanger 5b. Thus, a method of calculating the heat exchange amount is first described. A description is now given of the case of the heating operation, that is, the case where the heat-source heat exchanger serves as used as a heat receiver. Note that, in the following description, the air heat-source heat exchanger 5a and the underground heat-source heat exchanger 5b each configured to exchange heat with the heat source are sometimes collectively referred to as "heat-source heat exchanger" unless otherwise required to be distinguished. Further, in the following, "temperature of a heat source to be added" refers to "temperature $T_{aoi}$" of outdoor air flowing into the air heat-source heat exchanger 5a when the heat source to be added is outdoor air, and refers to "inflow brine temperature $T_{goi}$" of brine flowing into the underground heat-source heat exchanger 5b when the heat source to be added is underground heat.

(Heat Exchange Amount $Q_a$ in Air Heat-Source Heat Exchanger)

In the heating operation, the air heat-source heat exchanger 5a functions as an evaporator. The air heat-source heat exchanger 5a involves condensation in wet air (wet surface) in many cases, but the case where the surface of the heat exchanger on the air side does not involve condensation (dry surface) is described herein for simplicity.

A heat exchange amount $Q_a$ of the air heat-source heat exchanger 5a can be expressed by Expression (1) with use of an air volume $G_a$ passing through the air heat-source heat exchanger 5a, specific heat $C_{pa}$ of air, air-side temperature efficiency Ca, the outdoor air temperature $T_{aoi}$ detected by the outdoor air temperature sensor 34a, and a refrigerant saturation temperature $T_s$ detected by the refrigerant temperature sensor 32.

[Math. 1]

$$Q_a = G_a \cdot C_{pa} \cdot \epsilon_a \cdot (T_{aoi} - T_s) \qquad (1)$$

Provided that the refrigerant side has a saturation temperature and there is no temperature change in the flow direction inside the pipe, the air-side temperature efficiency Ca can be expressed by Expression (2) with use of an air-side heat transfer area $A_o$ and an overall heat transfer coefficient $K_a$ of the air heat-source heat exchanger 5a.

[Math. 2]

$$\varepsilon_a = 1 - \exp\left(-\frac{A_a \cdot K_a}{G_a \cdot C_{pa}}\right) \qquad (2)$$

The overall heat transfer coefficient $K_a$ has a proportional relationship with an air-side heat transfer coefficient $\alpha_o$ and a refrigerant-side heat transfer coefficient $\alpha_i$ as shown in Expression (3). Then, the air-side heat transfer coefficient $\alpha_o$ is proportional to the air volume $G_a$, and the refrigerant-side heat transfer coefficient $\alpha_i$ is proportional to a refrigerant flow velocity $V_{ref}$.

[Math. 3]

$$K_a \propto \frac{1}{\alpha_o} + \frac{1}{\alpha_i} \qquad (3)$$

Figure 4:
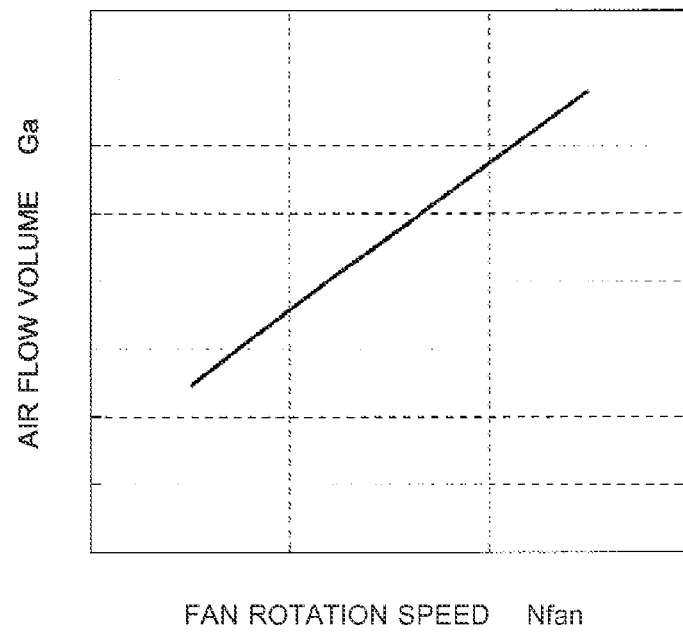
FIG. 4 is a graph showing a relationship between a fan rotation speed and an air volume in the air conditioning system of FIG. 1.
Figure 5:
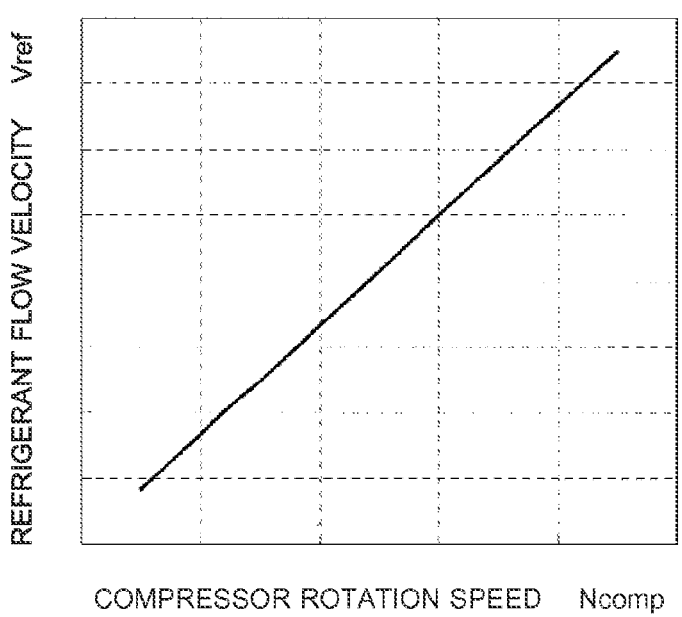
FIG. 5 is a graph showing a relationship between a compressor rotation speed and a refrigerant flow rate in the air conditioning system of FIG. 1.

Further, in general, the air volume $G_a$ has a relationship as shown in FIG. 4, for example, with a rotation speed $N_{fan}$ of the fan 8, and the refrigerant flow velocity $V_{ref}$ has a relationship as shown in FIG. 5, for example, with a compressor rotation speed $N_{comp}$.

For this reason, the relationship between the fan rotation speed $N_{fan}$ and the air volume $G_a$ shown in FIG. 4, the relationship between the compressor rotation speed $N_{comp}$ and the refrigerant flow velocity $V_{ref}$ shown in FIG. 5, the relationship between the air volume $G_a$ and the air-side heat transfer coefficient co, and the relationship between the refrigerant flow velocity $V_{ref}$ and the refrigerant-side heat transfer coefficient $\alpha_i$ are grasped in advance and stored in the storage device 31. Then, $G_a \cdot C_{pa} \cdot \Sigma_a$, which represents heat exchange performance of the air heat-source heat exchanger 5a, can be calculated by the controller 30 with use of those relationships and the current fan rotation speed $N_{fan}$ and compressor rotation speed $N_{comp}$.

Figure 6:
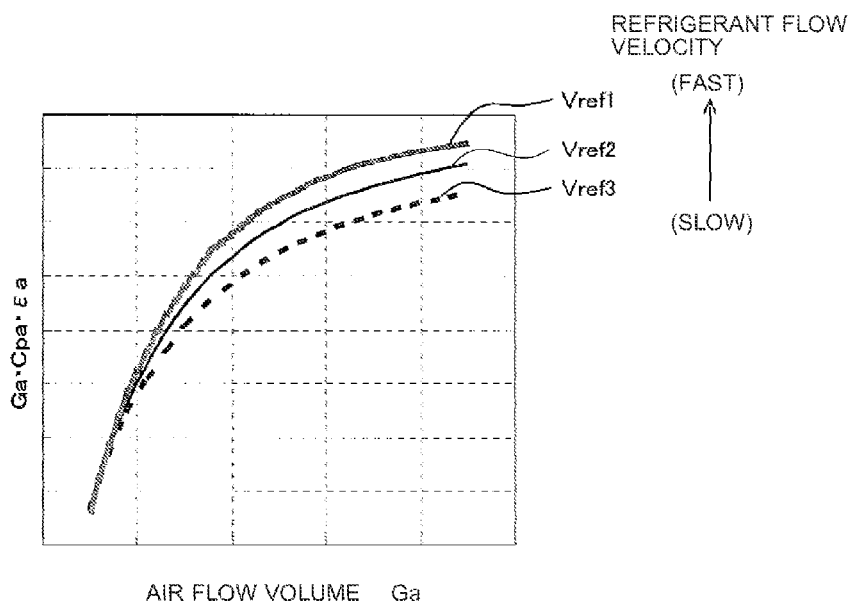
FIG. 6 is a graph showing a relationship between the air volume and heat exchanger performance in the air conditioning system of FIG. 1.

Note that, instead of storing the relationship between the air volume $G_a$ and the air-side heat transfer coefficient $\alpha_o$ and the relationship between the refrigerant flow velocity $V_{ref}$ and the refrigerant-side heat transfer coefficient $\alpha_i$, the following may be employed. Specifically, as shown in FIG. 6, a relationship between the air volume $G_a$ and $G_a \cdot C_{pa} \cdot \Sigma_a$ is stored for each of the refrigerant flow velocities $V_{ref1}$, $V_{ref2}$, $V_{ref3}$, . . . . Then, $G_a \cdot C_{pa} \cdot \epsilon_a$ may be determined with use of this relationship, the air volume $G_a$ determined from FIG. 4, and the refrigerant flow velocity $V_{ref}$ determined from FIG. 5. Note that, it is understood from FIG. 6 that the heat exchange performance is enhanced as the refrigerant flow velocity $V_{ref}$ becomes higher, provided that the air volume $G_a$ is the same.

Then, by substituting the heat exchanger performance $G_a \cdot C_{pa} \cdot \epsilon_a$ calculated by the controller 30, the outdoor air temperature $T_{aoi}$ and the refrigerant saturation temperature $T_s$ into Expression (1), the heat exchange amount $Q_a$ in the air heat-source heat exchanger 5a can be calculated.

Note that, as is generally known, the refrigerant-side heat transfer coefficient $\alpha_i$ is sufficiently larger than the air-side heat transfer coefficient $\alpha_o$. Accordingly, the overall heat transfer coefficient $K_a$ is dominated by the air side as is apparent from Expression (3). Thus, if the air-side heat transfer coefficient $\alpha_o$ is grasped, the overall heat transfer coefficient $K_a$ can be roughly determined. In this embodiment, in the determination of the necessity of the addition of a heat source to be described later, the compressor rotation speed, the refrigerant flow velocity, and the refrigerant-side heat transfer coefficient are taken into consideration. However, for example, in the case where the determination needs to be simplified, even if the refrigerant-side parameters are neglected but only the air-side parameters are used (that is, the fan rotation speed $N_{fan}$, the air volume $G_a$, and the air-side heat transfer coefficient $\alpha_o$ are used), the necessity of the addition of a heat source can roughly be determined.

(Heat Exchange Amount $Q_g$ in Underground Heat-Source Heat Exchanger)

Next, a method of calculating a heat exchange amount $Q_g$ in the underground heat-source heat exchanger 5b is described. The basic concept is the same as that of the air side. The heat exchange amount $Q_g$ of the underground heat-source heat exchanger 5b can be expressed by Expression (4) with use of a flow rate $G_g$ of the underground heat source-side medium (in this case, brine) circulating through the underground heat-source heat exchanger 5b, specific heat $C_{pg}$ of brine, brine-side temperature efficiency $\epsilon_g$, the inflow brine temperature $T_{goi}$ detected by the geothermal heat temperature sensor 34b, and the refrigerant saturation temperature $T_s$ detected by the refrigerant temperature sensor 32. Note that, in this case, the following calculation is performed on the assumption that the underground temperature is the inflow brine temperature.

[Math. 4]

$$Q_g = G_g \cdot C_{pg} \cdot \epsilon_g \cdot (T_{goi} - T_s) \quad (4)$$

Further, the brine-side temperature efficiency $\epsilon_g$ can be expressed by Expression (5) with use of a heat transfer area $A_g$ and an overall heat transfer coefficient $K_g$ of the heat exchanger, and the overall heat transfer coefficient $K_g$ can be expressed by Expression (6) with use of a brine-side heat transfer coefficient $\alpha_g$ and a refrigerant-side heat transfer coefficient $\alpha_{ig}$.

[Math. 5]

$$\epsilon_g = 1 - \exp\left(-\frac{A_g \cdot K_g}{G_g \cdot C_{pa}}\right) \quad (5)$$

[Math. 6]

$$K_g \propto \frac{1}{\alpha_g} + \frac{1}{\alpha_{ig}} \quad (6)$$

Similarly to the air heat-source heat exchanger 5a, the brine-side heat transfer coefficient $\alpha_g$ is proportional to a pump rotation speed $N_{pump}$, and the refrigerant-side heat transfer coefficient $\alpha_{ig}$ is proportional to a refrigerant flow velocity $V_{refg}$. For this reason, the relationship between the pump rotation speed $N_{pump}$ and the brine flow rate $G_g$, the relationship between the compressor rotation speed $N_{comp}$ and the refrigerant flow velocity $V_{refg}$, the relationship between the brine flow rate $G_g$ and the refrigerant-side heat transfer coefficient $\alpha_{ig}$, and the relationship between the refrigerant flow velocity $V_{refg}$ and the refrigerant-side heat transfer coefficient $\alpha_{ig}$ are grasped and stored in advance in the storage device 31. Then, $G_g \cdot C_{pg} \cdot \epsilon_g$, which represents heat exchanger performance of the underground heat-source heat exchanger 5b, can be calculated by the controller 30 with use of those relationships and the current pump rotation speed $N_{pump}$ and compressor rotation speed $N_{comp}$.

Note that, instead of storing the relationship between the brine flow rate $G_g$ and the brine-side heat transfer coefficient $\alpha_g$ and the relationship between the refrigerant flow velocity $V_{refg}$ and the refrigerant-side heat transfer coefficient $\alpha_{ig}$, the following may be employed. Specifically, a relationship between the brine flow rate $G_g$ and $G_g \cdot C_{pg} \cdot \epsilon_g$ is stored for each refrigerant flow velocity $V_{refg}$. Then, $G_g \cdot C_{pg} \cdot \epsilon_g$ may be determined based on this relationship, the brine flow rate $G_g$ determined from the pump rotation speed $N_{pump}$, and the refrigerant flow velocity $V_{refg}$ determined from the compressor rotation speed $N_{comp}$.

Then, by substituting the heat exchanger performance $G_g \cdot C_{pg} \cdot \epsilon_g$ calculated by the controller 30, the inflow brine temperature $T_{goi}$, and the refrigerant saturation temperature $T_s$ into Expression (4), the heat exchange amount $Q_g$ in the underground heat-source heat exchanger 5b can be calculated.

From the above, the method of calculating the heat exchange amount in each of the heat-source heat exchangers becomes apparent. Subsequently, the method of determining the necessity of the addition of a heat source is described. The determination of the necessity of the addition of a heat source is based on a determination criterion on whether or not the capacity is improved through the addition of the heat source. $T_{wo}$ kinds of specific determination methods are described below.

(Determination Method 1)

Needless to say, when the temperature of a heat source to be added is lower than the refrigerant temperature, both of Expression (1) and Expression (4) have negative values, with the result that heat cannot be received in the case of heating and heat cannot be transferred in the case of cooling. For this reason, as Determination Method 1 for the necessity of the addition of a heat source, in the case of heating, it is determined that the heat source needs to be added when the temperature of the heat source to be added is higher than the refrigerant temperature, and it is determined that the heat source does not need to be added when the temperature of the heat source to be added is equal to or lower than the refrigerant temperature. In the case of cooling, it is determined that the heat source needs to be added when the temperature of the heat source to be added is lower than the refrigerant temperature, and it is determined that the temperature of the heat source to be added is equal to or higher than the refrigerant temperature.

(Determination Method 2)

As Determination Method 2, in the case of the heating operation, the evaporating temperature to be measured when the heat source is added is estimated, and the necessity of the addition of the heat source is determined based on the result of comparison between the estimated evaporating temperature and the current refrigerant temperature. Specifically, it is determined that the heat source needs to be added when the estimated evaporating temperature is higher than the current refrigerant temperature, and it is determined that the heat source does not need to be added when the estimated evaporating temperature is equal to or lower than the current refrigerant temperature. The method of estimating the evaporating temperature to be measured when the heat source is added is described later.

In the case of the cooling operation, the condensing temperature to be measured when the heat source is added is estimated, and the necessity of the addition of the heat source is determined based on the result of comparison between the estimated condensing temperature and the current refrigerant temperature. Specifically, it is determined that the heat source needs to be added when the estimated condensing temperature is lower than the current refrigerant temperature, and it is determined that the heat source does not need to be added when the estimated condensing temperature is equal to or higher than the current refrigerant temperature.

As described above, the determination of the necessity of the addition of a heat source is based on the determination criterion whether or not the capacity is improved through the addition of the heat source, and the reason why Determination Method 2 conforms to the determination criterion is described below.

(Relationship Between Refrigerant Temperature and Use-Side Capacity)

First, the relationship between the refrigerant temperature (in this case, representing the evaporating temperature or the condensing temperature) and the capacity of the water heat exchanger 3 is described.

(1. Capacity is Larger as Evaporating Temperature Becomes Higher)

First, the case of using the heat-source heat exchanger as an evaporator is described. A heat exchange amount $Q_{load}$ in the water heat exchanger 3 can be expressed by Expression (7) with use of a refrigerant flow rate Gr and an enthalpy difference $\Delta H_{load}$ at the outlet and inlet of the use-side heat exchanger.

[Math. 7]

$$Q_{load} = Gr \times \Delta H_{load} \quad (7)$$

Further, the refrigerant flow rate Gr can be expressed by Expression (8) with use of a displacement $V_{comp}$ of the compressor 1 and a refrigerant density $\rho_s$ of the refrigerant sucked into the compressor 1.

[Math. 8]

$$Gr = V_{comp} \times \rho_s \quad (8)$$

Provided that the rotation speed of the compressor 1 reaches the upper limit and the displacement $V_{comp}$ is not increased any more, the refrigerant flow rate Gr increases along with the increase in refrigerant density $\rho_s$. Then, in general, the refrigerant density $\rho_s$ increases along with the rise in evaporating temperature (the relationship is not shown).

In other words, in the case where the refrigerant temperature of the heat-source heat exchanger becomes the evaporating temperature as in the heating operation, the refrigerant temperature, namely the evaporating temperature, is raised by enhancing the performance of the heat-source heat exchanger. Then, when the refrigerant density $\rho_s$ increases along with the rise in evaporating temperature, the refrigerant flow rate Gr increases, and the heat exchange amount $Q_{load}$ in the water heat exchanger 3 also increases along with the increase in refrigerant flow rate Gr as understood from Expression (7).

(2. Capacity is Larger as Condensing Temperature Becomes Lower)

Figure 7:
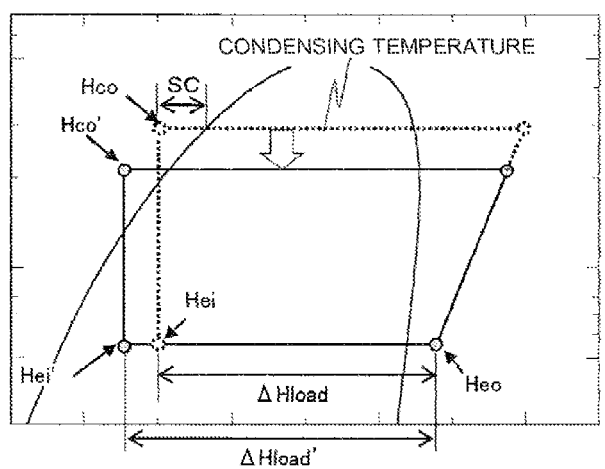
FIG. 7 is a graph showing a change in operating state in the air conditioning system of FIG. 1.

Next, the case of using the heat-source heat exchanger as a condenser is described with reference to a Mollier chart of FIG. 7. The enthalpy difference $\Delta H_{load}$ (=$H_{eo} - H_{ei}$) at the outlet and inlet of the water heat exchanger 3 is determined by a heat-source heat exchanger outlet enthalpy $H_{co}$ serving as the condenser. In the cooling operation in which the heat-source heat exchanger serves as the condenser, a condenser outlet subcooling degree (SC) is controlled so as to be constant at a predetermined value. Accordingly, provided that the condenser outlet subcooling degree (SC) is the same, the condenser outlet enthalpy $H_{co}$ decreases as the condensing temperature becomes lower as indicated by the white arrow in FIG. 7. In this case, the heat-source heat exchanger outlet enthalpy is changed to $H_{co'}$, the inlet enthalpy of the water heat exchanger 3 is changed to Her, and the enthalpy difference at the outlet and inlet of the water heat exchanger 3 is changed to $\Delta H_{load'}$. In other words, provided that the condenser outlet subcooling degree (SC) is the same, the enthalpy difference $\Delta H_{load}$ of the water heat exchanger 3 increases as the condensing temperature becomes lower.

Accordingly, in the case where the refrigerant temperature of the heat-source heat exchanger becomes the condensing temperature as in the cooling operation, when the condensing temperature decreases, the enthalpy difference $\Delta H_{load}$ increases, and the heat exchange amount $Q_{load}$ in the water heat exchanger 3 increases as understood from Expression (7).

As described above, the heat exchange amount in the water heat exchanger 3 increases when the evaporating temperature rises in heating or when the condensing temperature decreases in cooling. In other words, whether or not the heat exchange amount in the water heat exchanger 3 increases to enhance the capacity through the addition of another heat source can be determined based on whether the refrigerant temperature after the addition of the heat source rises or falls with respect to the refrigerant temperature before the addition.

From the above, by taking heating as an example, when the refrigerant temperature (that is, the evaporating temperature) rises through the addition of a heat source, the heat source is added because the heat exchange amount in the water heat exchanger 3 is expected to increase. In contrast, when the refrigerant temperature (that is, the evaporating temperature) falls through the addition of a heat source, the heat source is not added because the heat exchange amount in the water heat exchanger 3 is expected to decrease. From the above description, it becomes apparent that Determination Method 2 conforms to the determination criterion on whether or not the capacity is improved through the addition of a heat source.

(Description of Operation Switching Control Flow)

Figure 8:
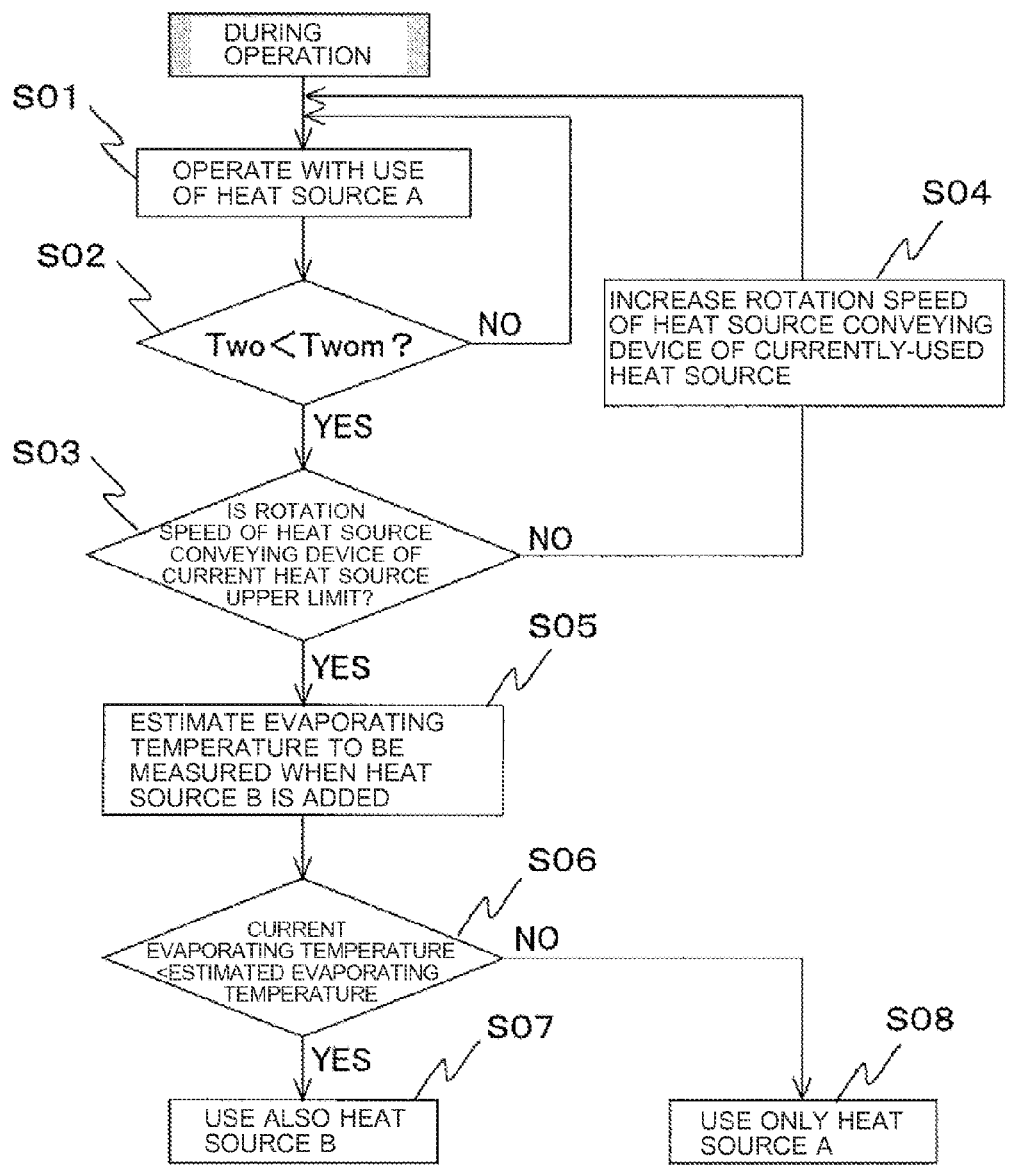
FIG. 8 is a flowchart for operation switch control in the heating operation in the air conditioning system of FIG. 1.

FIG. 8 is a flowchart for operation switching control in the heating operation of the air conditioning system of FIG. 1. In this case, FIG. 8 illustrates the flowchart to which Determination Method 2 is applied. Now, the operation of the heat pump device in the heating operation is described with reference to FIG. 8. The flowchart of FIG. 8 is a flowchart to be used to select whether or not Heat Source B is added in the heating operation using Heat Source A. In this case, Heat Source A is an underground heat source and Heat Source B is an air heat source.

The controller 30 drives the compressor 1, closes the expansion valve 4a, controls the opening degree of the expansion valve 4b, and drives the geothermal heat pump 22, to thereby perform the operation with use of the underground heat source as Heat Source A (S01). Then, the controller 30 compares an outlet water temperature $T_{wo}$ detected by the outlet water temperature detection sensor 53 with a target water temperature $T_{wom}$ (S02). When the outlet water temperature $T_{wo}$ is equal to or higher than the target water temperature $T_{wom}$ (No in S02), the controller 30 still performs the operation with use of the underground heat source (Heat Source A), and continues to control the outlet water temperature based on the frequency of the compressor 1 or the like.

However, when the capacity is insufficient even if the frequency of the compressor 1 is set to the upper limit, and the outlet water temperature $T_{wo}$ is lower than the target water temperature $T_{wom}$ (Yes in S02), the controller 30 performs the following control so that the outlet water temperature $T_{wo}$ may reach the target water temperature $T_{wom}$. First, the controller 30 determines whether or not the rotation speed of the geothermal heat pump 22, which is a heat source conveying device configured to convey the brine circulating through the underground heat-source heat exchanger 5b of the current heat source (in this case, the underground heat source), is the upper limit (S03). This determination may be performed based on a voltage command value, a current value, a water flow rate directly measured, or the like as well as the rotation speed on the geothermal heat pump 22 side. In other words, this determination is intended to determine whether or not the capacity is insufficient even when the actuator currently in operation is operated. The upper limit of the operation range of the actuator may be determined by, as for the compressor 1, not only the rotation speed range due to mechanical restriction but also the operating state (pressure, temperature) or the like. Further, the rotation speed of the heat source conveying device, such as the geothermal heat pump 22 and the fan 8, may be restricted by, for example, a current value in demand control in addition to the rotation speed range due to mechanical restriction.

When it is determined in S03 that the rotation speed of the geothermal heat pump 22 is not the upper limit, the controller 30 increases the rotation speed of the geothermal heat pump 22 to improve the heat exchange performance of the underground heat-source heat exchanger 5b (S04). The processing of S01 to S04 is repeated, and when the outlet water temperature $T_{WO}$ reaches the target water temperature $T_{wom}$, the controller 30 continues the operation with use of the current underground heat source (Heat Source A).

On the other hand, when the rotation speed of the geothermal heat pump 22 reaches the upper limit before the outlet water temperature $T_{wo}$ reaches the target water temperature $T_{wom}$ (Yes in S03), the controller 30 newly adds a heat source to compensate for the insufficiency of the capacity. The controller 30 first estimates an evaporating temperature $T_{r*}$, which is measured when the air heat source (Heat Source B) is added from the current state (S05). The estimation method is described later.

Next, the controller 30 compares the estimated evaporating temperature $T_{r*}$ with the current refrigerant saturation temperature (evaporating temperature) $T_r$ detected by the refrigerant temperature sensor 32 (S06). Then, when the estimated evaporating temperature $T_{r*}$ is higher than the current refrigerant saturation temperature $T_r$ (Yes in S06), the heat exchange amount is expected to increase through the addition of the air heat source (Heat Source B) as described above, and hence the controller 30 additionally uses the air heat source (Heat Source B) (S07). Specifically, the controller 30 opens the expansion valve 4a so that the refrigerant may flow to the air heat-source heat exchanger 5a, to thereby switch the single operation to the simultaneous operation, and drives the fan 8.

On the other hand, when the evaporating temperature $T_{r*}$ estimated in S05 is equal to or lower than the current refrigerant saturation temperature $T_r$ (No in S06), the controller 30 does not add the air heat source (Heat Source B), and continues the operation with use of the current underground heat source (Heat Source A) (S08). Specifically, the expansion valve 4b is kept closed, and the geothermal heat pump 22 is also kept stopped.

Note that, although not described in the flowchart of FIG. 8, during the operation, the controller 30 repeatedly calculates a refrigerant saturation temperature $T_{ra}$ of the air heat-source heat exchanger 5a, which is measured when only the air heat source is used, and a refrigerant saturation temperature $T_{rg}$ of the underground heat-source heat exchanger 5b, which is measured when only the underground heat source is used.

Then, after the operation is switched to the simultaneous operation, in the case of the heating operation, the controller 30 compares the refrigerant saturation temperature $T_{ra}$ and the refrigerant saturation temperature $T_{rg}$ with each other, and when the lower saturation temperature becomes lower than the current refrigerant saturation temperature detected by the refrigerant temperature sensor 32, the controller 30 stops the heat source corresponding to the lower refrigerant saturation temperature to switch the simultaneous operation to the single operation. On the other hand, in the case of the cooling operation, the controller 30 compares the refrigerant saturation temperature $T_{ra}$ and the refrigerant saturation temperature $T_{rg}$ with each other, and when the higher refrigerant saturation temperature becomes higher than the current refrigerant saturation temperature converted from the pressure detected by the pressure sensor 35, the controller 30 stops the heat source corresponding to the higher refrigerant saturation temperature to switch the simultaneous operation to the single operation. Note that, a sensor configured to measure a temperature at a two-phase section may be mounted at an intermediate portion of the air heat-source heat exchanger 5a or the underground heat-source heat exchanger 5b, and a refrigerant saturation temperature detected by the sensor may be used instead of "the current refrigerant saturation temperature converted from the pressure detected by the pressure sensor 35".

(Method of Estimating Refrigerant Temperature after Addition of Heat Source)

The refrigerant temperature after the addition of a heat source as described above is estimated as follows. The case where the underground heat source is used as a heat source and the air heat source is added in the heating operation is now described as an example. Note that, prior to a specific description of the method of estimating the refrigerant temperature after the addition of a heat source, first, how to determine the heat exchange amount flowing from the refrigerant side and how to determine the evaporating temperature of each heat-source heat exchanger are described. After that, the method of estimating the refrigerant temperature after the addition of a heat source is described with reference to a flowchart.

(How to Determine Heat Exchange Amount Flowing from Refrigerant Side)

The case of the heating operation, namely the case where the heat-source heat exchangers are used as evaporators, is now described. In the case of using both heat sources, in the refrigerant circuit 10 illustrated in FIG. 1, the respective outlet refrigerant temperatures of the heat-source heat exchangers 5a and 5b are equal to each other. In order for the heat-source heat exchangers to be used as the evaporators, the refrigerant temperature needs to be lower than the heat source temperatures (outdoor air temperature $T_{aoi}$, inflow brine temperature $T_{goi}$) as described above.

Specifically, for example, in the operation in which the underground heat is used as a heat source, in the case where the outdoor air is used as another heat source, when the temperature of the another heat source (outdoor air temperature $T_{aoi}$) is extremely low and lower than the refrigerant temperature, the evaporating temperature decreases through the addition of the heat source. Further, for example, in the operation in which the outdoor air is used as a heat source, in the case where the underground heat is added as another heat source, when the pump flow rate of the underground heat-source heat exchanger 5b is small and the heat exchange performance of the underground heat-source heat exchanger 5b is extremely lower than the current air heat-source heat exchanger 5a, the evaporating temperature decreases through the addition of the heat source.

In other words, the magnitude difference of the refrigerant temperature after the addition of a heat source with respect to the current refrigerant temperature is determined by the ratio of the heat exchange amounts in both the heat-source heat exchangers.

Similarly to the water heat exchanger 3, the heat exchange amount in each of both the heat-source heat exchangers is determined by the refrigerant flow rate Gr passing therethrough. Then, a refrigerant flow rate $Gr_a$ passing through the heat-source heat exchanger is expressed by Expression (9) using a Cv value, which is a flow rate coefficient of the expansion valve proportional to the opening degree of the expansion valve, and a pressure difference ΔP at the outlet and inlet of the expansion valve. In other words, the refrigerant flow rate $Gr_a$ is proportional to the opening degree of the expansion valve 4a or 4b connected in series to the heat-source heat exchanger.

[Math. 9]

$$Gr_a = A \times C_v \times \sqrt{\Delta P \times \rho} \quad (9)$$

where ρ represents the refrigerant density at the inlet of the expansion valve, and A represents a proportionality coefficient.

When the enthalpy difference at the outlet and inlet of the heat-source heat exchanger is represented by $\Delta H_s$, the heat exchange amount Q of the heat-source heat exchanger can be determined based on Expression (10).

[Math. 10]

$$Q = Gr \times \Delta H_s = A \times C_v \times \sqrt{\Delta P \times \rho} \times \Delta H_s \quad (10)$$

(Method of Calculating Refrigerant Temperature of Each Heat-Source Heat Exchanger)

An evaporating temperature $T_s$ as a refrigerant saturation temperature in the air heat-source heat exchanger 5a in the heating operation can be determined by Expression (11). Further, an evaporating temperature $T_s$ as a refrigerant saturation temperature in the underground heat-source heat exchanger 5b can be determined by Expression (12).

[Math. 11]

$$T_s = T_{aoi} - \frac{Q_a}{G_a \cdot C_{pa} \cdot \varepsilon_a} \quad (11)$$

[Math. 12]

$$T_s = T_{goi} - \frac{Q_g}{G_g \cdot C_{pg} \cdot \varepsilon_g} \quad (12)$$

In other words, provided that the heat exchange amount is the same, the evaporating temperature rises in both the heat sources as the heat exchanger performance ($G_a \cdot C_{pa} \cdot \varepsilon_a$, $G_g \cdot C_{pg} \cdot \varepsilon_g$) becomes higher. Further, it is also possible to use the calculated heat exchange amount of one of the heat sources to estimate the evaporating temperature to be measured when the other heat source is used.

(Description of Flowchart of Method of Estimating Refrigerant Temperature after Addition of Heat Source)

Figure 9:
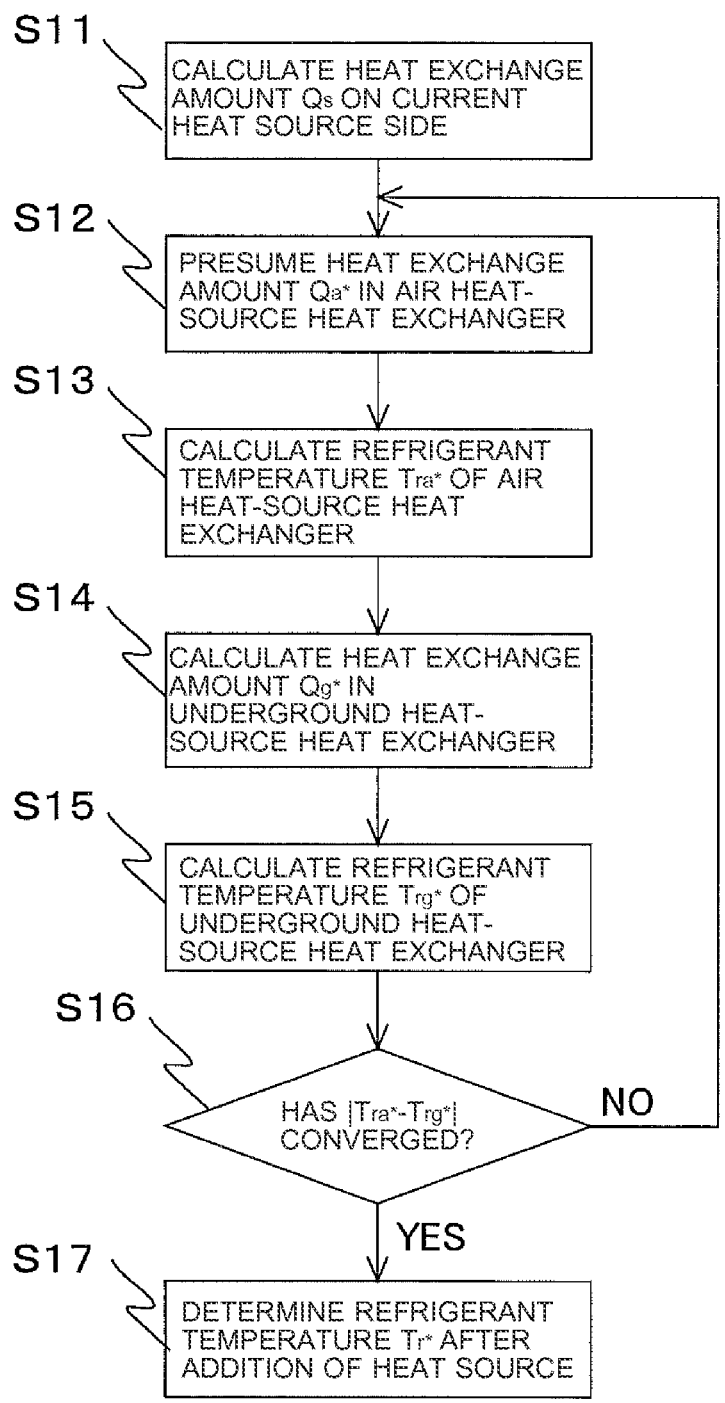
FIG. 9 is a flowchart illustrating a method of estimating a refrigerant temperature obtained when a heat source is added in the air conditioning system of FIG. 1.

FIG. 9 is a flowchart illustrating the flow of a method of estimating the refrigerant temperature after the addition of a heat source in the air conditioning system of FIG. 1.

The controller 30 calculates the heat exchange amount $Q_g$ in the current underground heat-source heat exchanger 5b based on Expression (4), and sets the calculated heat exchange amount $Q_g$ to be a total heat exchange amount Qs in the current heat-source heat exchanger (S11). Next, the controller 30 presumes a heat exchange amount $Q_{a*}$ in a heat source to be added, in this case, the air heat-source heat exchanger 5a (S12). In this step, an actual heat exchange amount $Q_{a*}$ may be calculated based on Expression (10) or the like. Specifically, for example, an initial expansion valve opening degree to be measured when the heat source is added is determined (determination of Cv value), and ΔP is determined from the measurement value, or assumed from the heat source temperature and the use-side water temperature. ΔH may be determined as evaporation latent heat with use of the current evaporating temperature, or may be determined with use of the current condenser outlet temperature and evaporator outlet temperature as shown in FIG. 7. Alternatively, the heat exchange ratio (for example, 50%) calculated in S11 may be given.

Then, the controller 30 calculates an estimated refrigerant temperature $T_{ra*}$ of the air heat-source heat exchanger 5a after the addition of the heat source based on Expression (13) (S13).

[Math. 13]

$$T_{tra*} = T_{aoi} - \frac{Q_{a*}}{G_a \cdot C_{pa} \cdot \varepsilon_a} \quad (13)$$

Subsequently, the controller 30 calculates a heat exchange amount $Q_{g*}$ in the underground heat-source heat exchanger 5b after the addition of the heat source. This calculation supposes that the total heat exchange amount Qs in the current heat-source heat exchanger does not vary even when the air heat source (Heat Source B) is added, and calculates the difference between the total heat exchange amount Qs and the heat exchange amount $Q_{a*}$ in the air heat-source heat exchanger 5a to set the calculated difference as the heat exchange amount $Q_{g*}$ in the underground heat-source heat exchanger 5b after the addition of the heat source (S14). Then, the controller 30 calculates a refrigerant temperature $T_{rg*}$ of the underground heat-source heat exchanger 5b after the addition of the heat source based on Expression (14) (S15).

[Math. 14]

$$T_{trg*} = T_{goi} - \frac{Q_{g*}}{G_g \cdot C_{pg} \cdot \varepsilon_g} \quad (14)$$

Then, the controller 30 determines whether or not the absolute value $|T_{ra*}-T_{rg*}|$ of the difference between $T_{ra*}$ and $T_{rg*}$ has converged (S16). Specifically, the controller 30 determines whether or not $|T_{ra*}-T_{rg*}|$ is equal to or smaller than a predetermined value (for example, 0.01 or the like). When it is determined that $|T_{ra*}-T_{rg*}|$ has not converged, the controller 30 returns to S12 to presume the heat exchange amount $Q_{a*}$ in the air heat-source heat exchanger 5a again. The above-mentioned processing is repeated until $|T_{ra*}-T_{rg*}|$ converges. The controller 30 determines $T_{ra*}$ at the time of convergence as a refrigerant temperature (evaporating temperature) $T_{r*}$ after the addition of the heat source (S17).

As described above, in this embodiment, in the case where the outlet water temperature $T_{wo}$ of the water heat exchanger 3 does not reach the target water temperature $T_{wom}$ in the single operation and the actuator currently in operation cannot be operated any more, the necessity of the addition of a heat source is determined, and when the capacity can be increased through the addition of the heat source, the heat source is added to switch the single operation to the simultaneous operation. Consequently, the amount of heat collected from the added heat source can be obtained to compensate for the insufficiency of the capacity, and the heat source can be appropriately selected, to thereby prevent the reduction in performance due to the addition of the heat source. As a result, the heat pump device capable of effectively using a heat source can be obtained.

Further, in the determination of the necessity of the addition of a heat source, the current refrigerant temperature and the temperature of the heat source to be added are compared with each other, and hence the determination can be easily performed.

Further, in the determination of the necessity of the addition of a heat source, as another determination taking the heat exchanger performance into consideration, the refrigerant temperature to be measured when the heat source is added is estimated, and the estimated refrigerant temperature is used to determine the necessity of the addition of the heat source. Consequently, the necessity of the addition of a heat source can be more accurately determined.

Further, in the case where both heat sources simultaneously operate in the simultaneous operation, the refrigerant temperature to be measured when only one of the heat sources is used is estimated and compared with the current refrigerant temperature. Consequently, the necessity of the stop of one of the heat sources can be accurately determined.

Further, a heat source to be used is determined in consideration of the heat exchanger performance, and hence the necessity of the addition of the heat source can be determined to appropriately enhance the capacity of the heat pump.

Note that, the heat source selection flow of FIG. 8 has been described for the configuration including two heat sources in a single refrigerant circuit, but the same concept is applicable to a configuration including three or more heat sources.

Further, in the above-mentioned embodiment, a description has been given of an example of using underground heat as a heat source other than the outdoor air. However, the heat source is not limited to the underground heat, and may be, for example, groundwater, seawater, river water, solar-heated water, a boiler, or the like.

Further, in the above-mentioned embodiment, the configuration including the four-way valve 2 has been described. However, the four-way valve 2 is not necessarily required, and may be omitted.

Further, in each embodiment, a description has been given of an example of the air conditioning system as an apparatus to which the heat pump device 40 is applied. However, the present invention is not limited thereto, and a hot water supply device system may be employed.

Figure 10:
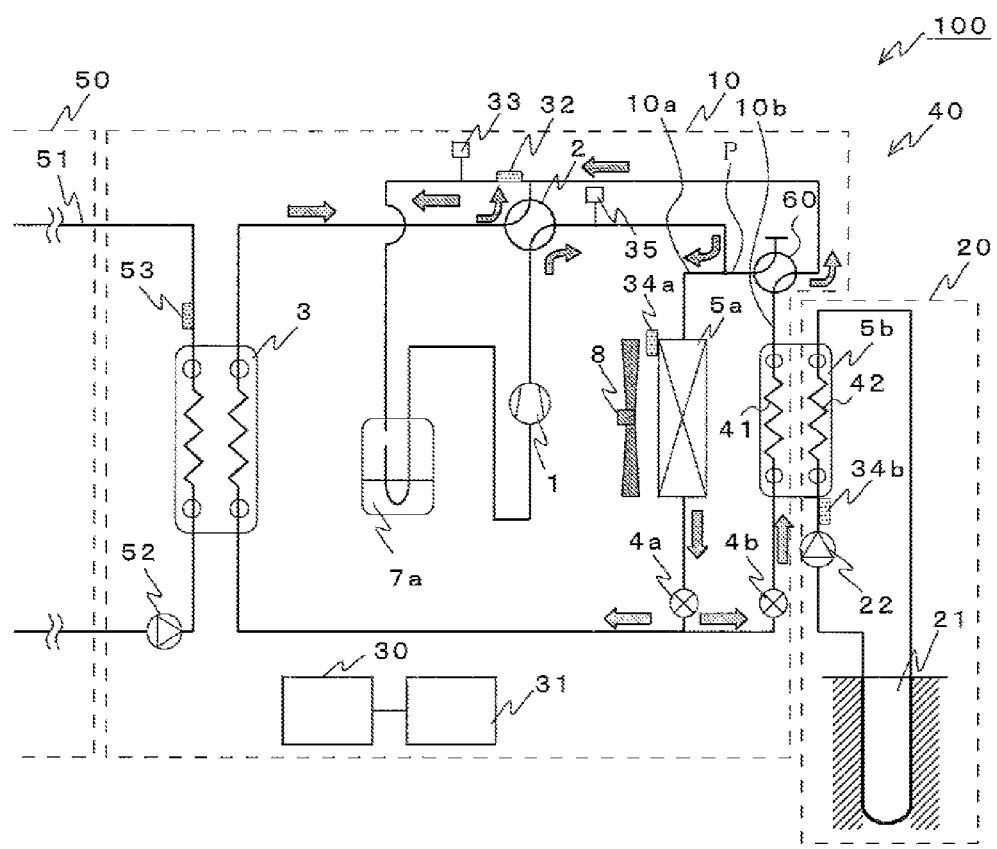
FIG. 10 is a diagram illustrating a modified example of the refrigerant circuit in the air conditioning system of FIG. 1.

Further, the refrigerant circuit 10 is not limited to the illustrated configuration, and may include a three-way valve 60 as illustrated in FIG. 10. The three-way valve 60 is arranged between a junction P at which respective refrigerants flowing out from the air heat-source heat exchanger 5a and the underground heat-source heat exchanger 5b join each other in the heating operation and the underground heat-source heat exchanger 5b. Then, the three-way valve 60 switches the passage to the junction P side or the compressor suction side between the normal operation and a defrosting operation of defrosting the air heat-source heat exchanger 5a. Note that, the arrows in FIG. 10 represent the flow of a refrigerant in the defrosting operation.

In the defrosting operation, the four-way valve 2 is switched to the cooling operation side so that the air heat-source heat exchanger 5a may function as a condenser, and the three-way valve 60 is switched to the compressor suction side so that the underground heat-source heat exchanger 5b may function as an evaporator. In this manner, the refrigerant discharged from the compressor 1 flows into the air heat-source heat exchanger 5a to defrost the air heat-source heat exchanger 5a. Then, the refrigerant after the defrosting is depressurized by the expansion valve 4a, and thereafter branches into two passages. One refrigerant flows through the water heat exchanger 3. The other refrigerant flows through the expansion valve 4b, the underground heat-source heat exchanger 5b, and the three-way valve 60 in this order, and thereafter joins the refrigerant that has flown through the water heat exchanger 3. Then, the refrigerant passes through the refrigerant container 7a to be sucked into the compressor 1 again. Note that, also in this defrosting operation, the geothermal heat pump 22 is driven to collect underground heat in the underground heat source-side circuit 20, and the amount of the thus collected heat in addition to the amount of work of the compressor 1 can be used as the amount of heat for defrosting.

In the above-mentioned embodiment, the geothermal heat pump 22 is stopped when the air heat source is selected, and the fan 8 is stopped when the underground heat source is selected. Note that, however, the geothermal heat pump 22 and the fan 8 are not necessarily required to be stopped, and may be driven as necessary. For example, the geothermal heat pump 22 is regularly driven in order to prevent the freezing of the pipes of the underground heat source-side circuit 20. Further, the fan 8 may be driven in order to transfer heat from the substrate of the controller 30 or to detect a proper outdoor air temperature.

INDUSTRIAL APPLICABILITY

As an application example of the present invention, the present invention is effective for a heat pump device including a large number of heat sources.

The invention claimed is:

1. A heat pump device, comprising:
a refrigerant circuit comprising a first circuit and a second circuit,
the first circuit comprising:
a compressor;
a refrigerant passage of a use-side heat exchanger;
a first pressure reducing device; and
a first heat-source heat exchanger configured to use outdoor air serving as a first heat source as a heat source,
the second circuit comprising:
a second pressure reducing device; and
a refrigerant passage of a second heat-source heat exchanger, the refrigerant passage being connected in series to the second pressure reducing device,
the second circuit being connected in parallel to the first pressure reducing device and the first heat-source heat exchanger of the first circuit,
the compressor having a discharge side connected to a condenser, wherein the use side heat exchanger serves as the condenser or at least either one of the first heat-source heat exchanger and the second heat-source heat exchanger serves as the condenser;
a heat exchange medium circuit comprising a heat exchange medium passage of the second heat-source heat exchanger, and configured to circulate therethrough a heat exchange medium serving as a second heat source,
the second heat source being used to exchange heat with another heat source than the outdoor air so as to receive heat of the another heat source;
an outlet temperature detector configured to detect an outlet temperature of a use-side medium flowing out from a use-side medium passage of the use-side heat exchanger; and
a controller having a single operation selecting the first heat-source heat exchanger or the second heat-source heat exchanger to cause a refrigerant to flow therethrough and a simultaneous operation causing a refrigerant to flow through both of the first heat-source heat exchanger and the second heat-source heat exchanger,
wherein, in a case where the use-side heat exchanger serves as the condenser, the controller,
when the outlet temperature of the use-side medium detected by the outlet temperature detector is less than a target temperature,
switches the single operation to the simultaneous operation.

2. The heat pump device of claim 1, wherein the controller, when a temperature of the heat source to be added by switching from the single operation to the simultaneous operation is higher than a refrigerant temperature of the heat-source heat exchanger that is currently selected, switches operation from the single operation to the simultaneous operation.

3. The heat pump device of claim 1, wherein in determination of whether or not capacity is improved through addition of a heat source, the controller estimates refrigerant temperatures at outlets of the first heat-source heat exchanger and the second heat-source heat exchanger, which are those after the heat source is added by switching from the single operation to the simultaneous operation, and, when the estimated refrigerant temperature is higher than a refrigerant temperature of the heat-source heat exchanger that is currently selected, switches operation from the single operation to the simultaneous operation.

4. The heat pump device of claim 1, wherein the controller is configured to:
compare, in the simultaneous operation, a refrigerant temperature of the first heat-source heat exchanger, which is measured when a single operation selecting the first heat-source heat exchanger is performed, and a refrigerant temperature of the second heat-source heat exchanger, which is measured when a single operation selecting the second heat-source heat exchanger is performed; and when a lower one of the refrigerant temperatures becomes lower than a refrigerant temperature of the heat-source heat exchanger that is currently selected, stop the heat source corresponding to the lower one of the refrigerant temperatures to switch the simultaneous operation to the single operation.

5. The heat pump device of claim 1, further comprising a main refrigerant flow switching valve connected to the compressor, and configured to switch a flow direction of the refrigerant discharged from the compressor.

6. The heat pump device of claim 1, wherein any one of geothermal heat, groundwater, seawater, solar-heated water, and a boiler is used as the another heat source.

7. A heat pump device, comprising:
a refrigerant circuit comprising a first circuit and a second circuit,
the first circuit comprising:
a compressor;
a refrigerant passage of a use-side heat exchanger;
a first pressure reducing device; and
a first heat-source heat exchanger configured to use outdoor air serving as a first heat source as a heat source,
the second circuit comprising:
a second pressure reducing device; and
a refrigerant passage of a second heat-source heat exchanger, the refrigerant passage being connected in series to the second pressure reducing device,
the second circuit being connected in parallel to the first pressure reducing device and the first heat-source heat exchanger of the first circuit,
the compressor having a discharge side connected to a condenser, wherein the use side heat exchanger serves as the condenser or at least either one of the first heat-source heat exchanger and the second heat-source heat exchanger serves as the condenser;
a heat exchange medium circuit comprising a heat exchange medium passage of the second heat-source heat exchanger, and configured to circulate therethrough a heat exchange medium serving as a second heat source, the second heat source being used to exchange heat with another heat source than the outdoor air so as to receive heat of the another heat source;

an outlet temperature detector configured to detect an outlet temperature of a use-side medium flowing out from a use-side medium passage of the use-side heat exchanger; and a controller having a single operation selecting the first heat-source heat exchanger or the second heat-source heat exchanger to cause a refrigerant to flow therethrough and a simultaneous operation causing a refrigerant to flow through both of the first heat-source heat exchanger and the second heat-source heat exchanger, wherein, in a case where the use-side heat exchanger serves as a evaporator, the controller, when the outlet temperature of the use-side medium detected by the outlet temperature detector is greater than a target temperature, switches the single operation to the simultaneous operation.

8. The heat pump device of claim 7, wherein the controller, when a temperature of the heat source to be added by switching from the single operation to the simultaneous operation is lower than a refrigerant temperature of the heat-source heat exchanger that is currently selected, switches operation from the single operation to the simultaneous operation.

9. The heat pump device of claim 7, wherein the controller estimates refrigerant temperatures at outlets of the first heat-source heat exchanger and the second heat-source heat exchanger, which are those after the heat source is added by switching from the single operation to the simultaneous operation, and when the estimated refrigerant temperature is lower than a refrigerant temperature of the heat-source heat exchanger that is currently selected, switches operation from the single operation to the simultaneous operation.

10. The heat pump device of claim 7, wherein the controller is configured to:

compare, in the simultaneous operation, a refrigerant temperature of the first heat-source heat exchanger, which is measured when a single operation selecting the first heat-source heat exchanger is performed, and a refrigerant temperature of the second heat-source heat exchanger, which is measured when a single operation selecting the second heat-source heat exchanger is performed; and when a higher one of the refrigerant temperatures becomes higher than a refrigerant temperature of the heat-source heat exchanger that is currently selected, stop the heat source corresponding to the higher one of the refrigerant temperatures to switch the simultaneous operation to the single operation.

11. The heat pump device of claim 7, further comprising a main refrigerant flow switching valve connected to the compressor, and configured to switch a flow direction of the refrigerant discharged from the compressor.

12. The heat pump device of claim 7, wherein any one of geothermal heat, groundwater, seawater, solar-heated water, and a boiler is used as the another heat source.

* * * * *